July 18, 1944.  J. L. HAJEK, JR  2,354,116
AUXILIARY WING AND WHEEL RETRACTING MECHANISM FOR AIRPLANES
Filed April 8, 1942  4 Sheets-Sheet 1
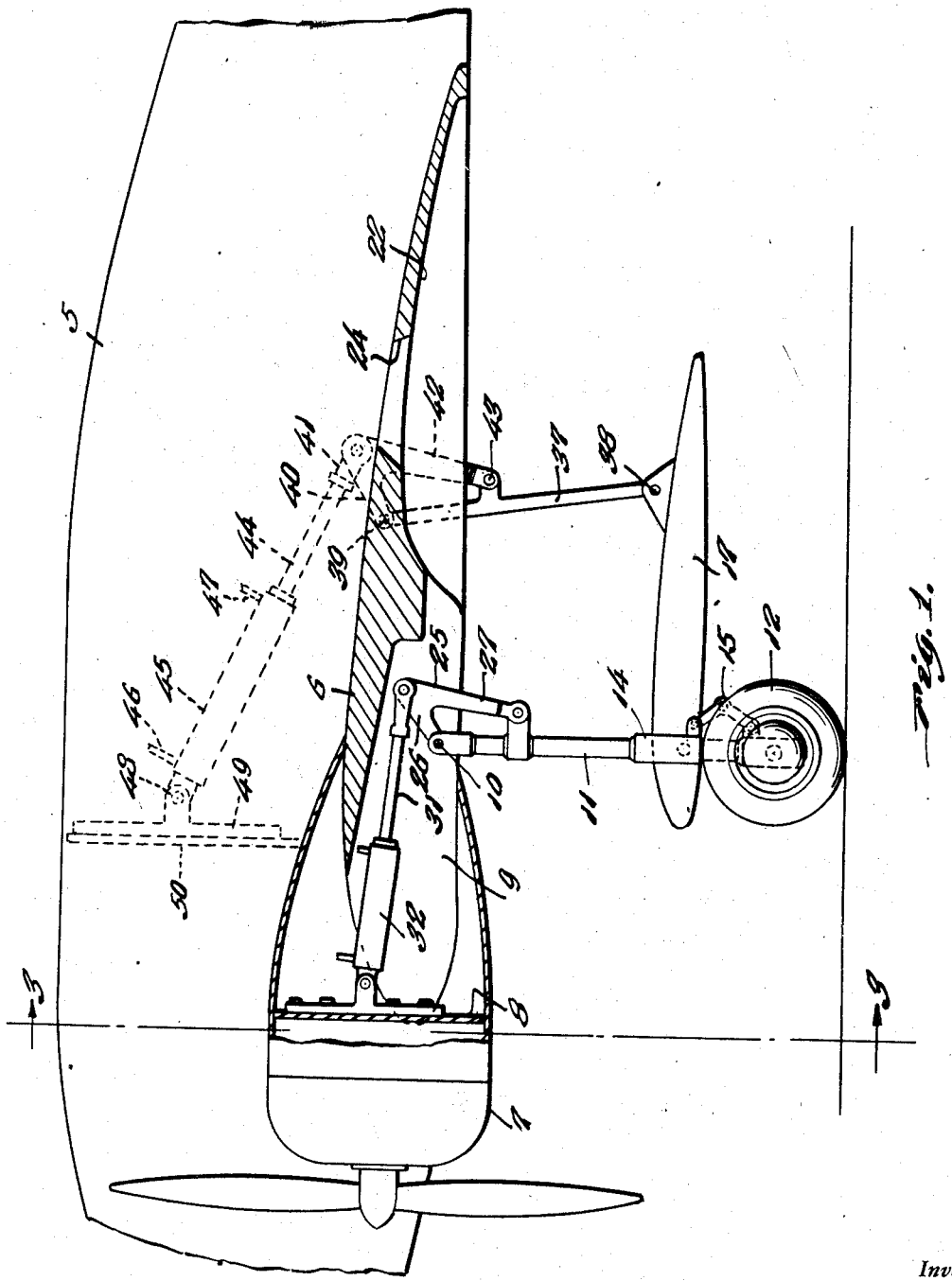
Inventor
James L. Hajek, Jr.
By Clarence A. O'Brien
and Harvey B. Jacobson
Attorneys

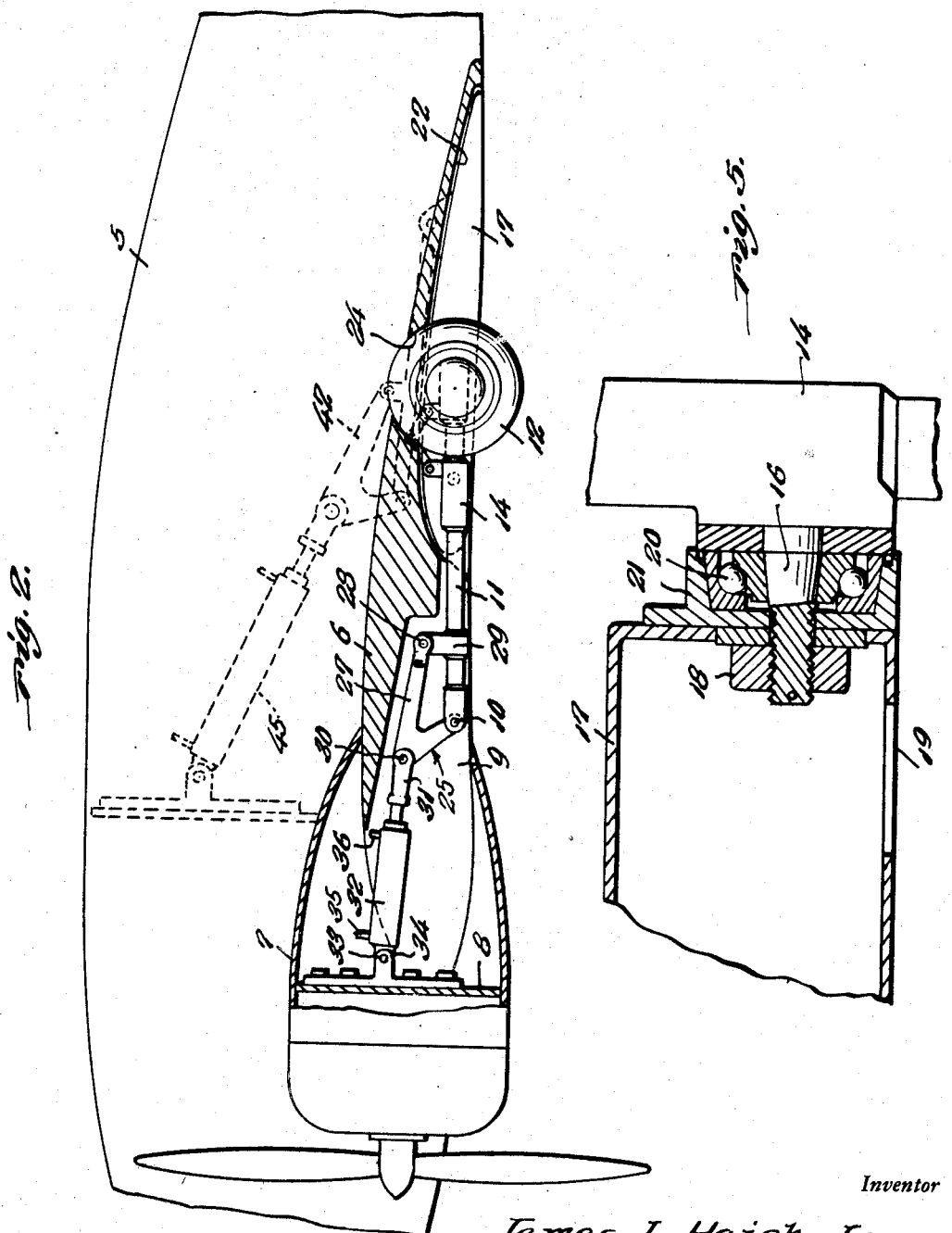

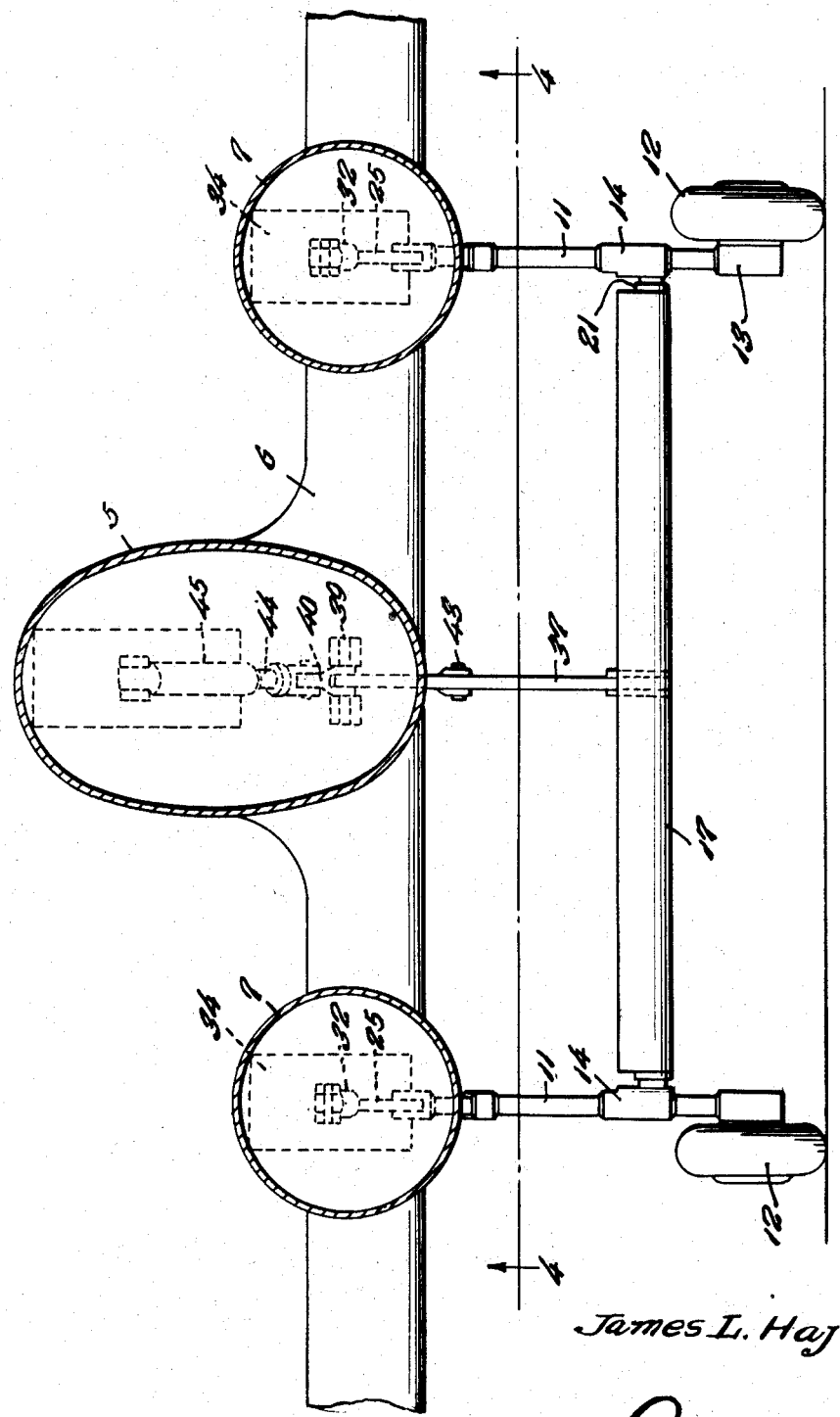

July 18, 1944.   J. L. HAJEK, JR   2,354,116
AUXILIARY WING AND WHEEL RETRACTING MECHANISM FOR AIRPLANES
Filed April 8, 1942   4 Sheets—Sheet 4
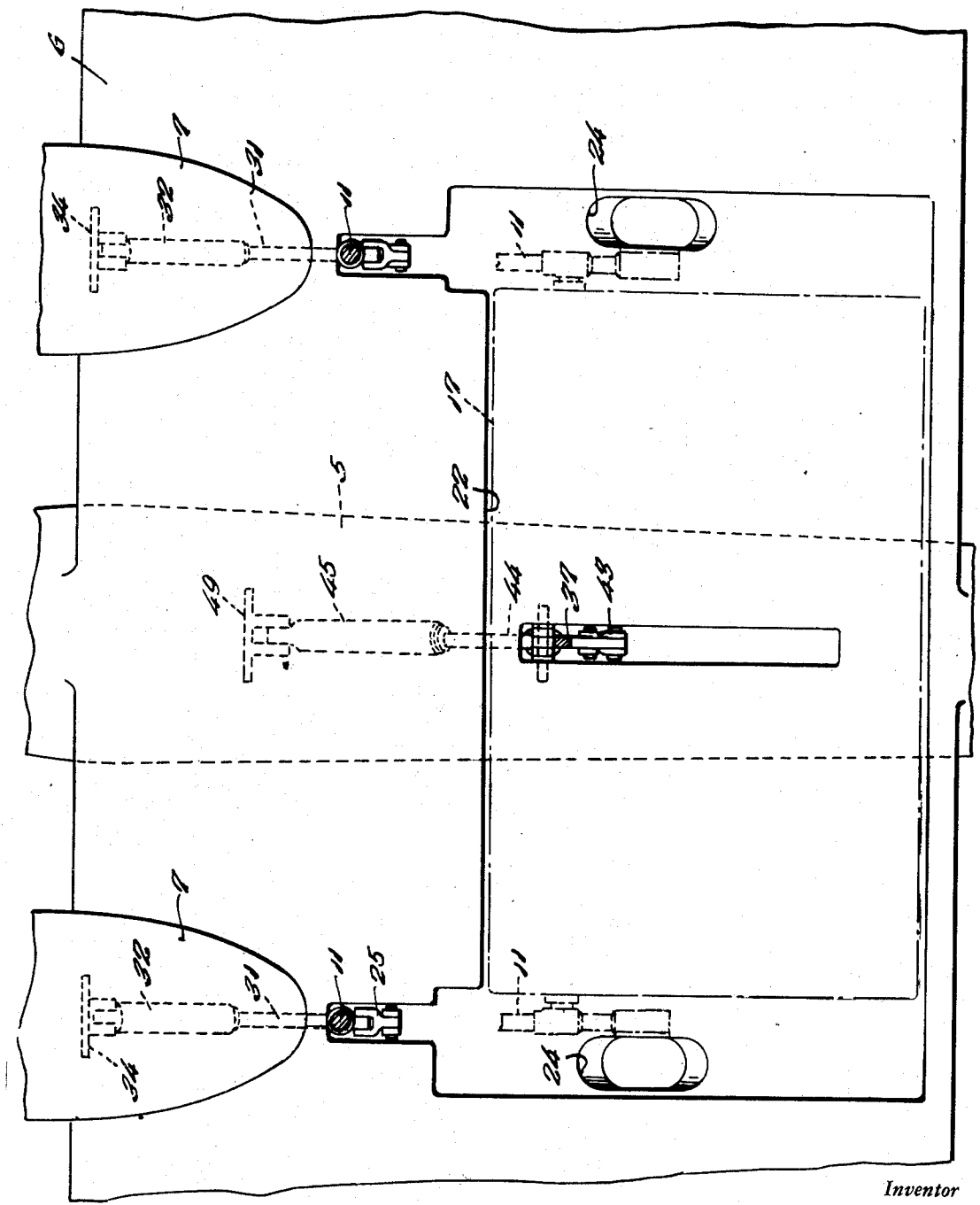
Inventor
James L. Hajek, Jr.
By Clarence A. O'Brien
and Harvey B. Jacobson
Attorneys Patented July 18, 1944

2,354,116

UNITED STATES PATENT OFFICE 2,354,116

AUXILIARY WING AND WHEEL RETRACTING MECHANISM FOR AIRPLANES

James Laddie Hajek, Jr., Cleveland, Ohio

Application April 8, 1942, Serial No. 438,176

1 Claim. (Cl. 244—102)

The present invention relates to a new and useful improvement in airplane construction and has for its primary object to provide an auxiliary wing adapted to be utilized to provide an increased wing area for the machine while the same is landing and taking off and also to provide means for attaching a pair of retractable wheels to the auxiliary wing for movement of the wing and the wheel into retracted position, as a unit, when the airplane is in flight.

A further object is to provide an auxiliary wing and wheel retracting mechanism of this character of simple and practical construction, which is efficient and reliable in performance, relatively inexpensive to manufacture and install in operative position, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a fragmentary side elevational view of an airplane fuselage with the main wing shown in section and with the auxiliary wing and wheel shown in projected position.

Figure 2 is a similar view showing the auxiliary wing and wheel in retracted position.

Figure 3 is a vertical sectional view taken substantially on a line 3—3 of Figure 1.

Figure 4 is a fragmentary bottom plan view, with parts broken away and shown in section, and Figure 5 is a sectional view showing the pivotal mounting for the wheel prop at the outer end of the auxiliary wing.

Referring now to the drawings in detail, wherein for the purpose of illustration I have disclosed a preferred embodiment of the invention, the numeral 5 designates the fuselage of an airplane from the opposite sides of which adjacent its lower portion, the main wing 6 projects. Mounted in the leading edge of the wing at opposite sides of the fuselage are a pair of motor nacelles 7, the rear ends of which merge with the wings and are provided with an internal fire wall 8.

The underside of the wing 6, in the region of the nacelles 7, is formed with a recess 9, a pivot pin 10 extending transversely of the recess adjacent the leading edge of the wing and to which is pivotally attached the upper end of a wheel strut 11 having the wheel 12 journaled on its lower end by means of a conventional form of mounting 13. The lower end of the strut 11 is of telescopic construction and includes a tubular sleeve 14 to which a conventional form of shock-absorbing mechanism 15 is attached to the mounting 13.

Projecting laterally from the inner side of the sleeve 14 is a spindle 16 having its end secured in an adjacent end of an auxiliary wing 17 by means of a nut 18, access to the nut being afforded through an opening 19 in the bottom of the wing. A ball-bearing assembly 20 is provided for the spindle 16 mounted in a housing 21 on the outer end of the auxiliary wing to facilitate pivotal movement of the spindle relative to the auxiliary wing.

A pair of the wheel struts 11 is provided, one immediately behind each of the motor nacelles 7 and the auxiliary wing 17 extends between the struts with the ends of the wings attached thereto, as will be apparent from an inspection of Figure 3 of the drawings.

The underside of the main wing 6, adjacent its trailing edge, is provided with a recess 22 adapted to conformably receive the auxiliary wing 17 for moving the latter into a retracted position together with the wheel struts 11 and wheels 12. The main wings 6 are also provided with openings 24 extending entirely therethrough to accommodate the wheels 12 so that a portion of the wheel will project through the upper surface of the wings 6 when the wheels are in their retracted position, as shown to advantage in Figure 2 of the drawings.

A bellcrank lever, indicated generally at 25, is provided with a short leg 26 and a long leg 27, the short leg being pivoted on the pivot member 10 and the long leg 27 being pivoted as at 28 to a clamp 29 secured to the strut 11 below its pivoted end. The bellcrank lever is of substantial V-form and the converging ends of the legs 26 and 27 are pivoted as at 30 to the outer end of a piston rod 31 projecting into a cylinder 32 within which the piston rod is connected to the usual piston (not shown) working in the cylinder. The front end of the cylinder is pivoted as at 33 to a bracket 34 secured to the fire wall 8 of the motor nacelle. Compressed air pipes 35 and 36 are connected to the respective ends of the cylinder for actuating the piston therein whereby to retract and project the struts 11 and wheels 12.

A lever 37 is pivotally attached at one end as at 38 to an intermediate portion of the auxiliary wing 17, adjacent its rear end, the other end of the lever being pivoted, as at 39, at a point within the fuselage 5 and also pivotally attached to the pivot 39 is the short leg 40 of a V-shaped bellcrank lever 41. The long leg 42 of the bellcrank lever is pivoted as at 43 to an intermediate portion of the lever 37. To the converging ends of the legs 40 and 42 of the bellcrank lever is pivoted the outer end of a piston rod 44 which projects into a cylinder 45 having a piston (not shown) also working therein and actuated by means of the compressed air connections 46 and 47 communicating with the opposite ends of the cylinder. The front end of the cylinder 45 is pivoted as at 48 to a bracket 49 secured on a partition 50 within the fuselage.

Accordingly, through the utilization of compressed air from a suitable source of power connected to the cylinders 32 and 45, the struts 11 and lever 37 may be actuated to move the auxiliary wing 17 into and out of retracted position in the recess 22 at the underside of the main wing 6 and at the same time the wheels 12 will also be moved into and out of retracted position.

When the airplane is ready to take off or land, the auxiliary wing 17 and the wheels 12 are in their projected positions and the auxiliary wing is thus utilized to increase the wing area to facilitate the ascent and descent of the airplane. After the machine becomes maintained in flight, the auxiliary wing and wheels may be moved into their retracted positions to reduce wind resistance.

It is believed the details of construction, operation and advantages of the device will be readily understood from the foregoing without further detailed explanation.

Having thus described the invention what I claim is:

An airplane comprising a main wing having a recess in its underside, a pair of landing wheel struts pivoted at their upper ends to said main wing, said struts having wheels journaled at their lower ends and said struts and wheels being movable into and out of retracted position in said recess, stub shafts projecting laterally from the struts, an auxiliary wing, means pivotally attaching the ends of the auxiliary wing to the respective stub shafts of the struts, a strut pivotally connecting the auxiliary wing to the main wing, bellcrank levers each having an end pivoted to the main wing at the respective pivots for the wheels and wing struts and another end pivoted to the respective struts intermediate their ends, and actuating means for the levers adapted to move the wheel struts and the auxiliary wing into and out of retracted position in the recess.

JAMES L. HAJEK, Jr.